United States Patent [19]

Limiero et al.

[11] 3,840,710

[45] Oct. 8, 1974

[54] KEY TELEPHONE LINE CIRCUIT

[75] Inventors: Albert David Limiero, Denver; John Paul Smith, Broomfield, both of Colo.

[73] Assignee: Bell Telephone Laboratories Incorporated, Murray Hill, N.J.

[22] Filed: May 21, 1973

[21] Appl. No.: 362,190

[52] U.S. Cl. .......... 179/99

[51] Int. Cl. .......... H04m 1/00

[58] Field of Search .......... 179/99, 81 R, 176, 84 R

[56] References Cited

UNITED STATES PATENTS

| | | | |
|---|---|---|---|
| 3,283,083 | 11/1966 | MacLeod | 179/99 |
| 3,436,488 | 4/1969 | Barbato et al. | 179/84 R |
| 3,676,608 | 7/1972 | Goldthorp et al. | 179/99 |
| 3,748,403 | 7/1973 | Schartmann et al. | 179/99 |
| 3,748,404 | 7/1973 | Davis et al. | 179/99 |
| 3,748,405 | 7/1973 | Saba | 179/99 |

*Primary Examiner*—Kathleen H. Claffy
*Assistant Examiner*—Douglas W. Olms
*Attorney, Agent, or Firm*—David H. Tannenbaum

[57] ABSTRACT

A key telephone line circuit is disclosed having improved hold control features. The improved circuit is balanced against longitudinal-to-metallic noise conversion by an arrangement which divides the hold impedance equally between both conductors of the central office or PBX line, while still maintaining the line relay operable for detecting loop current. The new arrangement also contains a delay timer for maintaining the hold bridge operated during inadvertent central office loop open conditions. Circuitry is provided for immediately releasing the hold bridge when the subscriber returns from a held condition.

10 Claims, 1 Drawing Figure

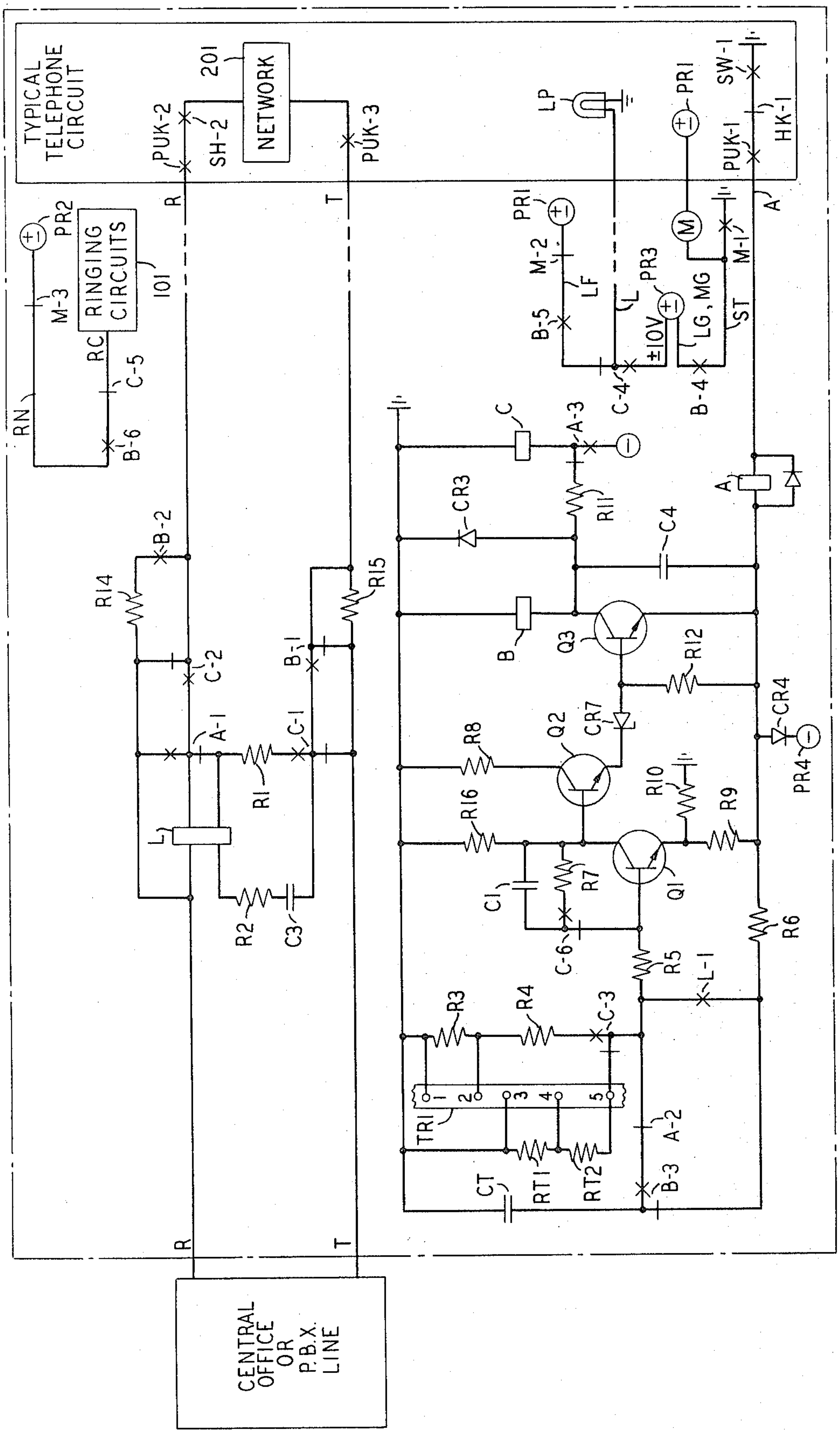
TYPICAL TELEPHONE CIRCUIT
NETWORK
201
RINGING CIRCUITS
101
CENTRAL OFFICE OR P.B.X. LINE

KEY TELEPHONE LINE CIRCUIT

BACKGROUND OF THE INVENTION

This invention relates to telephone line circuits and, more particularly, to line circuits of the type utilized in key telephone systems.

A telephone line circuit is a basic part of a telephone network in that it provides the necessary interface between a subscriber's set and the switching equipment at central switching points such as PBXs or central offices. More specifically, a telephone line circuit performs those supervisory and control functions that are incident to the establishment of a connection between a central switching point and one or more local subscriber's telephone sets. These functions typically involve signaling a particular subscriber's station in response to the detection of a ringing signal from the central office or PBX switching point. In some instances, the ringing signal from the switching point may be utilized directly to operate a local ringer at the subscriber's station. In other arrangements, the received ringing signal may be detected by a ringing detector arrangement in the line circuit which in turn extends ringing current from a local source to the ringer. The latter arrangement may be employed, for example, in key telephone systems wherein there is a need for signaling a number of subsets in response to an incoming call. Combinations of these two types of line circuit arrangements are also known in the prior art.

Other functions performed by prior art line circuits relate to line holding arrangements. In a key telephone system, for example, it may be desirable to hold one line, keeping the line in an inactive but waiting condition, while actually transmitting and receiving on a second line. Means must be provided for manual release of a line from its hold condition as well as means responsive to central office control that will also release the held line.

One problem that must be overcome when designing a hold circuit is longitudinal-to-metallic noise conversion which can occur when the line is in the hold condition. It has long been known that if the conductors of a line circuit have unequal impedance to ground voltage differentials will occur on the line resulting in a "hum" condition. Several circuits have been designed to eliminate longitudinal problems in key telephone systems. For example, in U.S. Pat. No. 3,322,902 issued to A. C. Carney on May 30, 1967, the ringing bridge, as opposed to the hold bridge, was improved to eliminate longitudinal voltage problems. In U.S. Pat. No. 3,436,488 issued to R. E. Barbato and D. T. Davis on Apr. 1, 1969, the hold impedance is bridged across the T and R conductors of the line circuit and the L relay winding is inserted in the R conductor. Thus, the R conductor has a greater impedance to ground than does the T conductor, thereby resulting in the possibility of a "hum" condition on certain connections. In the prior art, where line current relay detectors are used, a separate relay is added to the other conductor to balance the system. This is a costly solution since the coil would always be in the circuit, thereby decreasing the sensitivity, and thus the range, of the loop.

Another problem that must be overcome with respect to the hold control circuitry arises from the fact that the hold function must be released under two divergent conditions; namely, (1) when the subscriber at the key station returns from the hold condition by enabling the line pickup key, and (2) when current stops flowing in the central office loop, i.e., open (or shorted) loop condition. However, in the latter case, under certain conditions the central office loop opens periodically at times when it is not desired to release the hold bridge. Accordingly, the hold bridge must be designed to span such intervals and to only release when the central office loop current has stopped flowing for a specific period of time.

In prior art systems such as the system described in the above-mentioned Barbato, et al, patent, the release time of the L relay has been adjusted to span the central office open condition. However, this arrangement also causes problems in that the release of the hold condition is controlled by the release of the L relay and, thus, the hold release time is delayed when the subscriber returns from hold. Under such a condition, the subscriber, after reoperating the line pickup key, must wait a period of time before communication can be resumed on the held line. This is an undesirable condition.

Accordingly, a need exists in the art for a key telephone line circuit arranged to provide immediate release when the subscriber returns from the hold condition and to provide delayed release when the central office loop is opened.

A further need exists in the art for a key telephone line circuit arranged to provide balanced impedance on the line when that line is on hold.

It is a general object of our invention to provide a key telephone line circuit which solves both of these problems in an economical manner while at the same time reducing the cost of such circuits.

SUMMARY OF THE INVENTION

These and other objects and advantages of our invention have been achieved in an embodiment wherein the hold bridge longitudinal-to-metallic noise conversion problem has been solved by distributing the hold impedance between both the T and R conductors while still maintaining the loop current detector (L relay winding) in the line loop on the R conductor. The problem which has been solved was not simply one of splitting resistors but in selectively changing the impedance value of the L relay winding during the hold interval while at the same time maintaining that winding susceptible to the detection of loop current flow.

The hold bridge release problems have been solved for the subscriber-returning-from-hold situation by shunting the L relay winding by a contact of the A relay, which relay operates when the pickup key is enabled. Another contact of the A relay is used to bypass a delay timer, thereby giving immediate release to the hold bridge. In the situation where the central office current is interrupted, the L relay releases but since the A relay is unoperated the delay timer maintains the bridge in the hold condition for a certain period of time. Either one of these hold bridge release conditions can occur regardless of whether the connection between the central office and the subscriber station was established on an outgoing basis from the subscriber or on an incoming basis from the central office.

An additional problem has been solved by our arrangement of distributing the impedance in the manner discussed above. By this arrangement, the return loss as seen from the switching network is increased, thereby reducing echo or reflected signals. This result is achieved from the combination of the increased hold impedance and the balanced condition of the line.

Accordingly, it is one feature of our invention that a key telephone line circuit is arranged with the hold impedance distributed equally on the T and R conductors while still maintaining the L relay operable for the detection of current flow.

It is another feature of our invention to reduce the reflected signal by balancing the line circuit and by increasing the effective impedance of the hold bridge.

It is still another feature of our invention that the hold bridge releases immediately in the situation where a subscriber returns from a hold condition and releases only after a specific interval in situations where the central office loop current momentarily stops.

BRIEF DESCRIPTION OF THE DRAWING

The principles of the invention as well as additional objects and features thereof will be fully appreciated from the illustrative embodiment shown in the drawing, in which the single FIGURE is a schematic circuit diagram of a line circuit in accordance with the invention.

DETAILED DESCRIPTION

A description of the operation of our invention will be presented in terms of the operation of a line circuit during each significant operating mode.

Circuit Response to Incoming Ringing Signal

When the circuit shown in the single FIGURE of the drawing is in the idle condition, each of the relays A, B, C and L is in the unoperated state and transistors Q2 and Q3 are nonconducting or off. Transistor Q1 is held in a conducting or on condition by current supplied to its base from ground through the resistor network formed by resistors RT1 and RT2, released break contact C-3 and resistor R5. At this time, capacitor CT is fully charged from negative battery through resistor R6 and released break contact B-3.

Operation of the line circuit is initiated by the application of ringing voltage across the leads T and R at the central office or other central switching point, such as a PBX. When ringing voltage is applied, ringing current flows through the series connected primary and secondary windings of relay L, resistor R2 and capacitor C3, thereby causing relay L to operate on each half cycle of ringing current.

When relay L operates, negative battery from forward-biased diode CR4 and resistor R6 is supplied via enabled make contact L-1 to the resistive grounded side of resistor R5 to the base of transistor Q1. Since relay C is unoperated at this time, the base of transistor Q1 is connected through released break contact C-6 to a timing network formed by capacitor C1 and resistor R16. This timing network serves to maintain transistor Q1 operated for a short period of time to guard against transient operation.

When transistor Q1 turns off, as described above, its collector voltage rises and transistor Q2 turns on. Zener diode CR7, connecting the emitter of transistor Q2 to the base of transistor Q3, breaks down and transistor Q3 turns on, supplying current in the collector circuit to operate relay B. Relay C does not operate at this time inasmuch as resistor R11 limits the current through its winding to less than its operate value. Relay B operated connects ground to the ST or start lead by way of make contact B-4 to start the operation of motor M, a motor typically common to groups of line circuits of the type shown. Motor M effects the operation of cam-controlled interrupter contacts M-2 and M-3 and also closes a cam-operated make contact M-1 to ensure continued motor operation. Indicator lamp LP, a lamp conventionally mounted in the telephone set (not shown) for signaling a busy line, is lighted by current from the source PR1 by way of lead LF, enabled make contact B-5, unoperated break contact C-4 and lead L. Lamp flashing is effected by the operation of interrupter contact M-2. Additionally, the operation of relay B extends interrupted ringing current from source PR2 to the ringing circuits 101 for audible signal control by way of lead RC, enabled make contact B-6 and unoperated break contact C-s. Ringing current is interrupted by the repeated operation of break contact M-3. Conventional wiring options, not shown, may be provided so that steady ringing current may be offered as an alternative; or, a ground connection may be made available to operate buzzers or other types of audible indicators. Transistor Q1 remains off and transistors Q2 and Q3 remain on until the call is either answered or timed out after ringing from the central switching point is removed.

Time-Out Action of Ringup Circuit

As was discussed previously, prior to the operation of the L and B relays capacitor CT is fully charged. The significance of this arrangement is that the CT capacitor, in conjunction with the RT1 and RT2 resistors, acts to bridge the silent interval between ringing cycles where the L relay would be released by providing negative potential to the base of transistor Q1 via operated make contact B-3 and released break contact A-2. At the termination of the time-out period, as controlled by the discharge time constant of the CT, RT1, RT2 network (which network is controllable by a strap between terminals 3 and 4 of terminal strip TR1), if the called station has not answered and if no further ringing potential has been applied to reoperate the L relay, transistor Q1 turns back on and the circuit returns to the idle state.

Answering an Incoming Call - Busy State

An incoming call is answered by operating the conventional pickup key, not shown, associated with the line being rung and moving the receiver to the off-hook condition. The station or telephone network proper 201 is then connected across the line by way of pickup key contacts PUK-2 and PUK-3 and switchhook contact SH-2. Ringing is tripped at the central office in the normal manner. Ground is also connected through operated switchhook contact SW-1, released hold key contact HK-1 and operated pickup contact PUK-1 to the A lead thus operating relay A. The A relay operating, by its make contact A-1, shunts the upper or primary winding of relay L, preventing relay L from operating on line current. Relay C operates from battery from operated make contact A-3. Operated break contact A-2 disconnects the negative side of capacitor CT from the base circuit of transistor Q1.

Since relay L is released, negative potential is removed from resistor R5 and ground via resistors R3 and R4 and enabled make contact C-3 causes transistor Q1 to turn on, thereby causing transistors Q2 and Q3 to turn off, thus releasing relay B. Relay B releasing causes capacitor CT to recharge from battery through resistor R6 and released break contact B-3. Relay C operating also removes the secondary winding of relay L from the T and R loop via enabled break contact C-1, thereby preventing the introduction of noise into the talking path and also eliminating the shunting effect on the line of the secondary winding in series with resistor R2 and capacitor C3. Relays A and C operated establish the talking path over make contacts A-1 and C-2, and connect lamp LP to a steady source of power PR3 by way of make contact C-4. Lead RC is opened at break contact C-5 to discontinue local audible signaling.

The procedure for making an outgoing call is the same as that for answering an incoming call except that transistors Q2 and Q3 are normally off and relay B is released.

Holding Function

A busy line can be placed in a hold condition by operating the conventional hold key, not shown, on the telephone set. When the hold key is depressed, operating break contact HK-1, ground is disconnected from the A lead causing relay A to release. Make contact A-1, shunting the primary of relay L, opens and inasmuch as the station has not at this point been disconnected from the line, relay L operates on line current which flows between the T and R conductors of the central office or PBX loop. Operation of relay L and its make contact L-1 causes the base of transistor Q1 to be connected through resistor R6 to battery, causing transistor Q1 to turn off and transistors Q2 and Q3 to turn on. Transistor Q3 turns on approximately two milliseconds after relay A releases, and a holding path is thereby provided for relay C by way of resistor R11, transistor Q3 and diode CR4 to battery. Finally, relay B operates over the emitter-collector path of transistor Q3. Relays B and C operated with relay A released causes the hold bridge to be connected across the T and R leads of the central office or PBX line.

The hold bridge consists of the parallel combination of resistor R14 and one winding of the L relay in the R conductor, resistor R15 in the T conductor and resistor R1 between the conductors. The resistance value of resistor R15 is set to equal the parallel resistance value of resistor R14 and the L relay winding. This value is determined by the formula $n \cdot n1 / n + n1$ where $n$ equals the relay winding resistance and nl equals the resistance value of resistor R14. The value of nl must be chosen so that the L relay will remain operated so long as current flows in the T and R loop. Typically, $n$ would be 80 ohms and $n1$ would be 100 ohms. Accordingly, resistor R15 would have a resistance value of 68 ohms and resistor R1 would have a value of 62 ohms, giving a hold bridge loop resistance value of approximately 200 ohms.

Resistor R14 is shunted across the L relay winding and this combination is inserted in the Rconductor by enabled transfer contact C-2, operated make contact B-2 and released transfer contact A-1. Resistor R15 is inserted in the T conductor by enabled transfer contacts B-1 and C-1. Under this arrangement each conductor and the T and R loop pair has an equal resistive impedance to ground, thus reducing longitudinal-to-metallic noise conversion on the T and R pair when the line circuit is in the hold mode. This arrangement also improves the return loss, as seen by the T and R pair, thereby reducing reflected energy (echo) back to the central switching point.

Release of the Holding Bridge by a Station

Any station of the key telephone system that seizes the line by operating the associated pickup key and going off-hook will cause relay A to operate in the manner described, and shunt the primary winding of relay L which then releases substantially immediately. Since capacitor CT is out of the circuit, via enabled break contact A-2, transistor Q1 turns on via enabled make contact C-3 and resistors R3 and R4 to ground, and thus transistors Q2 and Q3 turn off, releasing relay B. Relay C is held operated by relay A over make contact A-3. The circuit is thus restored to the busy state.

Nonrelease of the Hold Bridge From the Central Office or PBX by Momentary Open Circuit Line Conditions Since the L relay is being held operated by loop current flowing in the T and R leads, even though that relay is being shunted by resistor R14, when the line current stops flowing, the L relay releases immediately. Accordingly, battery from resistor R6 is removed from the base circuit of transistor Q1. However, transistor Q1 remains off due to the discharge of the CT capacitor via enabled make contact B-3, released break contact A-2, and enabled make contact C-3. Resistors R3 and R4 in conjunction with capacitor CT thus form a delay circuit for preventing the release of the hold bridge for a certain time constant, the extent of which is controllable by straps across terminals 1 and 2 of terminal strip TR1 or by changing the value of resistors R3 or R4, or of capacitor CT. Under this arrangement, there is no need to delay the mechanical release time of the L relay in order to bridge T and R loop open conditions; thus, when the key telephone station returns from a hold condition, the L relay is free to release immediately and, as discussed above, the hold bridge is also released immediately.

Release of the Hold Bridge Under Sustained Open Loop Conditions

When the T and R loop is opened for a period of time in excess of the CT capacitor discharge time, negative potential is removed from the base of transistor Q1, which transistor turns on and releases the hold bridge in the manner discussed above.

Disconnection

When all of the stations in a system in accordance with the invention go on-hook, the A lead is disconnected from ground causing relay A to release. The release of relay A opens the holding path for relay C at make contact A-3 and relay C releases. In this way, the circuit is restored to its idle state.

Operation With Local Power Failure

During periods when the local dc supply is inoperative, it is still possible to originate outgoing calls. When the station goes off-hook, connection to the line is metallic. The primary and secondary windings of relay L are connected in series with resistor R2 and capacitor C3 across the line but this path has a negligible effect on the talking circuit. Incoming calls are signaled by line ringers in the conventional manner although visual and common audible signals are inoperative.

It is to be understood that the embodiment described herein is merely illustrative of the principles of the invention. A variety of modifications thereto may be effected by persons skilled in the art without departing from the spirit and scope of the invention.

What is claimed is:

1. A line circuit for use in a key telephone system, said line circuit adapted for connection between a subscriber station and a two-conductor line from a switching network, and adapted for providing loop current flow on said line when said associated subscriber station is in the hold condition, said line circuit comprising a first input pair of terminals for connecting said line circuit to said subscriber station, a second input pair of terminals for connecting said line circuit to each conductor of said line from said switching network, hold control means operable in response to a first signal from said subscriber station for placing an impedance across said second input pair of terminals so as to enable said loop current flow between said conductors of said associated line when said hold control means has been enabled, said hold control means balanced against longitudinal-to-metallic noise conversion and comprising a relay having at least one winding, said winding having a first terminal connected to one of said terminals of said second pair of terminals and said relay winding having an impedance of value $n$, a first resistor having resistance $n1$, means for connecting said first resistor in parallel with said relay winding when said hold control means has been enabled, a second resistor having resistance n2, said resistor having one terminal connected to said other terminal of said second pair of terminals, a third resistor having resistance $n3$, means for connecting said third resistor to a second terminal of said relay winding when said hold control means has been enabled, and means for connecting a second terminal of said third resistor to a second terminal of said second resistor when said hold control means has been enabled.

2. The invention set forth in claim 1 wherein said resistors have the relationship $n{\cdot}n1\ /n{+}n1$ equals approximately $n2$.

3. The invention set forth in claim 1 wherein said resistors have the further relationship $n{\cdot}n1\ /n{+}n1 + n2 + n3$ equals approximately 200 ohms.

4. The invention set forth in claim 1 further comprising means for removing said hold condition from said line, said hold condition removing means comprising means including said relay for detecting the presence or absence of loop current flowing in a line on hold, means for establishing a timed interval, means responsive to a release of said relay upon a detected absence of loop current when said line circuit is in said hold condition for enabling said timed interval means, and means responsive to the termination of said timed interval and controlled by said timed interval establishing means for releasing said hold control means.

5. The invention set forth in claim 4 wherein said hold condition removing means further comprises means controllable by said station for releasing said relay, and means responsive to the release of said relay under control of said station controllable means when said line circuit is in said hold condition for immediately releasing said hold control means.

6. A line cicuit for use in a key telephone system, said line circuit adapted for connection between a subscriber station and a two-conductor line from a switching network, and adapted for maintaining loop current flow on said line when said associated subscriber station is in the hold condition, said line circuit comprising hold control means operable in response to a signal from said subscriber station for placing a hold bridge across said switching network line, said hold control means including a relay having one winding thereof connected in one of said line conductors, said relay adapted for operation when said loop current is flowing between said conductors and for releasing when said loop current stops flowing between said conductors, and said relay having an impedance $n$, a first impedance having an impedance value $n1$, means for connecting said first impedance in parallel with said relay winding when said hold control means has been enabled, a second impedance having an impedance value $n2$, means for connecting said second impedance between said switching network conductors when said hold control means has been enabled, a third impedance having an impedance value $n3$, and means for connecting said third impedance in said other of said switching network conductors when said hold control means has been enabled.

7. The invention set forth in claim 6 wherein said impedances have the relationship $n{\cdot}n1/n{+}n1$ equals approximately $n2$.

8. The invention set forth in claim 6 wherein said impedances have the further relationship $n{\cdot}n1/n{+}n1 + n2 + n3$ equals approximately 200 ohms.

9. The invention set forth in claim 6 further comprising means for removing said hold condition from said line, said hold condition removing means comprising means including said relay for detecting the presence or absence of loop current flowing in a line on hold, means for establishing a timed interval, means responsive to a release of said relay upon a detected absence of loop current when said line circuit is in said hold condition for enabling said timed interval means, and means responsive to the termination of said timed interval and controlled by said timed interval establishing means for releasing said hold control means.

10. The invention set forth in claim 6 wherein said hold condition removing means further comprises means controllable by said station for releasing said relay, and means responsive to the release of said relay under control of said station controllable means when said line circuit is in said hold condition for immediately releasing said hold control means.

* * * * *